(12) United States Patent
Rubino et al.

(10) Patent No.: US 11,075,421 B1
(45) Date of Patent: Jul. 27, 2021

(54) MINIATURE ELECTROCHEMICAL CELL HAVING A CASING OF A METAL CONTAINER CLOSED WITH A CERAMIC PLATE HAVING A VIA HOLE SUPPORTING A PLATINUM-CONTAINING CONDUCTIVE PATHWAY

(71) Applicant: Greatbatch Ltd., Clarence, NY (US)

(72) Inventors: Robert S. Rubino, Williamsville, NY (US); Keith W. Seitz, Clarence Center, NY (US); Brian P. Hohl, Clarence, NY (US)

(73) Assignee: Greatbatch Ltd., Clarence, NY (US)

( * ) Notice: Subject to any disclaimer, the term of this patent is extended or adjusted under 35 U.S.C. 154(b) by 89 days.

(21) Appl. No.: 16/422,103

(22) Filed: May 24, 2019

(51) Int. Cl.
*H01M 50/116* (2021.01)
*H01M 50/183* (2021.01)
*H01M 50/557* (2021.01)

(52) U.S. Cl.
CPC ....... *H01M 50/116* (2021.01); *H01M 50/183* (2021.01); *H01M 50/557* (2021.01)

(58) Field of Classification Search
CPC .. H01M 2/026; H01M 2/0272; H01M 2/0285; H01M 2/0486; H01M 2/0495; H01M 4/8673; H01M 50/109; H01M 50/11; H01M 50/153; H01M 50/181; H01M 50/157; H01M 50/166
See application file for complete search history.

(56) References Cited

U.S. PATENT DOCUMENTS

| | | | |
|---|---|---|---|
| 3,957,538 A | * | 5/1976 | Fairweather .......... H01M 2/065 429/171 |
| 5,338,625 A | | 8/1994 | Bates et al. |
| 5,521,029 A | * | 5/1996 | Fiorino ................. H01M 4/662 205/150 |
| 6,268,079 B1 | | 7/2001 | Inoue et al. |
| 6,782,290 B2 | | 8/2004 | Schmidt |
| 6,818,356 B1 | | 11/2004 | Bates |
| 6,984,468 B2 | | 1/2006 | Rubino et al. |

(Continued)

FOREIGN PATENT DOCUMENTS

| | | |
|---|---|---|
| DE | 102011103975 A1 | 12/2012 |
| EP | 0269007 A1 | 6/1988 |

(Continued)

OTHER PUBLICATIONS

Extended European Search Report, Application No. 19150718.0, dated Apr. 4, 2019.

*Primary Examiner* — Maria Laios
*Assistant Examiner* — Adam J Francis
(74) *Attorney, Agent, or Firm* — Michael F. Scalise (57) ABSTRACT

A miniature electrochemical cell having a volume of less than 0.5 cc is described. The cell casing has a ceramic substrate, preferably of alumina, that is part of a metal-containing feedthrough formed by co-firing a metallic paste in a via hole extending through a green state ceramic. The sintered feedthrough serves as a header assembly that is then joined to an open-ended container by a gold-braze to thereby provide the cell casing. The metallic container serves as a terminal for one of the electrodes, for example the anode, while the metal fill material resulting from sintering the metallic paste serves as the opposite polarity terminal, for example the positive terminal for the cathode.

29 Claims, 2 Drawing Sheets

(56) References Cited

U.S. PATENT DOCUMENTS

| | | | |
|---|---|---|---|
| 7,022,146 | B2 | 4/2006 | Rubino et al. |
| 7,524,577 | B2 | 4/2009 | Bates |
| 7,553,582 | B2 | 6/2009 | Bates |
| 7,811,702 | B2 | 10/2010 | Laurent et al. |
| 8,679,674 | B2 | 3/2014 | Liang et al. |
| 8,697,278 | B2 | 4/2014 | Schnell et al. |
| 8,778,532 | B2 | 7/2014 | Salot et al. |
| 8,815,450 | B1 | 8/2014 | Bates |
| 8,865,340 | B2 | 10/2014 | Liang et al. |
| 9,318,774 | B2 | 4/2016 | Bhardwaj et al. |
| 9,455,423 | B2 | 9/2016 | Etzkorn et al. |
| 9,599,842 | B2 | 3/2017 | Flitsch et al. |
| 9,793,522 | B2 | 10/2017 | Bhardwaj et al. |
| 9,887,403 | B2 | 2/2018 | Huang et al. |
| 10,236,480 | B2 | 3/2019 | Fallourd |
| 2005/0007718 | A1 | 1/2005 | Stevenson et al. |
| 2010/0129717 | A1 | 5/2010 | Bedjaoui et al. |
| 2015/0004359 | A1* | 1/2015 | Shahbazi ............ H01B 1/22 428/137 |
| 2015/0004478 | A1 | 1/2015 | Prinzbach et al. |
| 2015/0214567 | A1 | 7/2015 | Etzkorn et al. |
| 2016/0049624 | A1 | 2/2016 | Bhardwaj et al. |
| 2016/0254566 | A1 | 9/2016 | Pepin et al. |
| 2016/0325105 | A1 | 11/2016 | Etzkorn et al. |
| 2016/0365584 | A1 | 12/2016 | Etzkorn et al. |
| 2018/0083256 | A1* | 3/2018 | Marasco ............ H01M 2/065 |
| 2018/0108496 | A1 | 4/2018 | Venkateswaran et al. |

FOREIGN PATENT DOCUMENTS

| | | | |
|---|---|---|---|
| EP | 2262036 | B1 | 3/2012 |
| EP | 2192638 | B1 | 4/2013 |
| EP | 2469620 | B1 | 8/2013 |

\* cited by examiner

MINIATURE ELECTROCHEMICAL CELL HAVING A CASING OF A METAL CONTAINER CLOSED WITH A CERAMIC PLATE HAVING A VIA HOLE SUPPORTING A PLATINUM-CONTAINING CONDUCTIVE PATHWAY

BACKGROUND OF THE INVENTION

1. Field of the Invention

The present invention relates to the art of electrochemical cells. More particularly, the present invention relates to an improved miniature electrochemical cell. A miniature electrochemical cell is defined as a cell having a total volume that is less than 0.5 cc.

2. Prior Art

Conventional miniature electrochemical cells are primarily designed as coin cells, which is a convenient configuration for the assembly of small cells. A typical coin cell has a metal base and a metal lid that, electrically isolated from each other by a plastic gasket, serve as the opposite polarity terminals. A seal is formed by crimping the metal base around the gasket. The plastic gasket then electrically isolates the base and lid from each other.

However, seals formed by crimping a metallic member onto a plastic gasket are difficult to form consistently and are known to be unacceptably porous for hermetic applications. A compromised hermetic seal may present an escape path for electrolyte or allow atmospheric contaminants to get inside the cell and disrupt its operation. Ingress of water is particularly problematic for lithium electrochemical cells. In that respect, crimped plastic seals may not provide the type of consistent longevity from one cell to the next that is required for some applications, particularly when the cell is intended to power a device implanted in a human or animal body.

In addition, the crimped metal/plastic gasket seal has a certain peripheral volume requirement that reduces space for the electrodes, thereby reducing cell capacity and energy density. A conventional coin cell with a crimped seal may not have sufficient energy per unit volume to power the associated electronic device for an acceptable period of time. Further, there is a limit to how small a crimped seal can be made; below a certain size, it may not be possible to construct the coin cell at all.

Therefore, an improved miniature electrochemical cell having a total volume that is less than 0.5 cc. is needed. The cell enclosure must be both mechanically robust and resistive to corrosion of the type that can occur when the cell is implanted in an animal or human body. The miniature electrochemical cells of the present invention meet these needs.

SUMMARY OF THE INVENTION

As with every cell, miniature electrochemical cells according to the present invention have two terminals that are electrically isolated from each other. However, in order for the cell to operate for an extended period of time, preferably ten years or more, novel robust seals are required to prevent ingress of moisture or egress of electrolyte while still providing adequate electrical isolation between the opposite polarity terminals. The problem is that conventional sealing methods are often not practical when cell sizes drop below 0.5 cc. That is because the seals themselves become a major portion of the overall cell volume. In that light, the present invention describes multiple casing structures that are designed to provide a miniature electrochemical cell having a total volume of less than 0.5 cc with a hermetic seal exhibiting high volumetric efficiency.

In addition, as cells become smaller and smaller, it becomes more difficult to provide space for the electrolyte fill port, and to find a practical means of plugging and sealing the fill port. The present invention describes a novel fill port design and hermetic fill port sealing process that is readily adapted to miniature electrochemical cells having a total volume of less than 0.5 cc.

Another problem with conventional miniature electrochemical cell designs is the need for the materials from which the cell is constructed to be both chemically compatible with each other and not susceptible to undesirable corrosion reactions. A miniature electrochemical cell according to the present invention uses a conductive metal-containing paste that is filled into a via hole extending through a ceramic plate-shaped substrate. The ceramic plate is then sintered to provide a hermetic feedthrough or header assembly.

Next, a current collector is deposited on an inner surface of the lapped and polished ceramic plate in contact with the via fill material of the feedthrough or header assembly. In addition to providing electrical conduction from the electrode active layer to the metal fill material in the ceramic via hole, the current collector protects the metal fill material from corrosive reactions with other battery components while exhibiting good adhesion to the ceramic plate or to an adhesion layer on the plate should there be one. Exemplary current collectors according to the present invention are from about 0.1 microns to about 50 microns thick and are comprised of a metallic layer that is deposited on the ceramic plate using a physical vapor deposition (PVD) process, for example sputtering deposition and evaporation deposition, so that the deposited metal covers the via. Exemplary current collector materials include copper, titanium and Ti/NiV composites.

The feedthrough or header assembly is sized and shaped (configured) to close the open end of a metal container to thereby provide the cell casing. The metal container serves as an opposite polarity terminal for the electrode that is not electrically connected to the current collector connected to the metallic via fill material.

Thus, the present invention describes various miniature electrochemical cells. One of the anode and cathode terminals consists of a metal fill material residing in a via hole extending through a ceramic substrate or plate with the metal fill material being hermetically bonded or sealed to the ceramic plate. The bond is preferably formed by co-firing a metallic paste filled into a via hole extending through a green ceramic body. The fill metal is preferably platinum, gold or a platinum/ceramic composite and the ceramic plate is comprised of 3% YSZ or alumina.

One embodiment of a miniature electrochemical cell activated with a liquid electrolyte comprises a secondary via hole serving as an electrolyte fill port extending through the ceramic plate. A second metal fill material, similar to the metal fill material in the first via hole, resides in the second via hole or electrolyte fill port. An opening is then drilled through the second metal fill material. After the cell is filled with electrolyte, the metal fill material in the electrolyte fill port is melted, preferably using a laser, to form a hermetic seal at the fill port. As with the metal fill material in the first via hole, the metal in the electrolyte fill port is preferentially platinum, or a platinum ceramic composite.

Alternatively, the cell does not have a fill port. Instead, electrolyte is added prior to welding a first metal portion of an open-ended container to a second metal portion of the container. The open end is closed with the ceramic plate brazed to the container to thereby provide a casing for the cell.

These and other objects of the present invention will become increasingly more apparent to those of ordinary skill in the art by reference to the following descriptions and the appended drawings.

DETAILED DESCRIPTION OF THE PREFERRED EMBODIMENTS

A miniature electrochemical cell according to the present invention is not limited to any particular type of cell. The miniature electrochemical cell can be an alkaline cell, a primary lithium cell, a rechargeable lithium cell, a Ni/cadmium cell, a Ni/metal hydride cell, a supercapacitor, and the like. An exemplary miniature electrochemical cell is of a lithium-ion chemistry having a carbon-based anode and a metal oxide-based cathode, such as a cathode of $LiCoO_2$ or $LiNi_aMn_bCo_{1-a-b}O_2$. The cell is activated with a liquid electrolyte, which is added to the electrode assembly through a fill port provided in a ceramic substrate portion of the casing. Alternately, the electrode assembly is activated with a liquid electrolyte filled into an open-ended metal container. The open end of the container is closed with a ceramic plate that is brazed to the container to thereby provide a casing for the cell.

Figure 1:
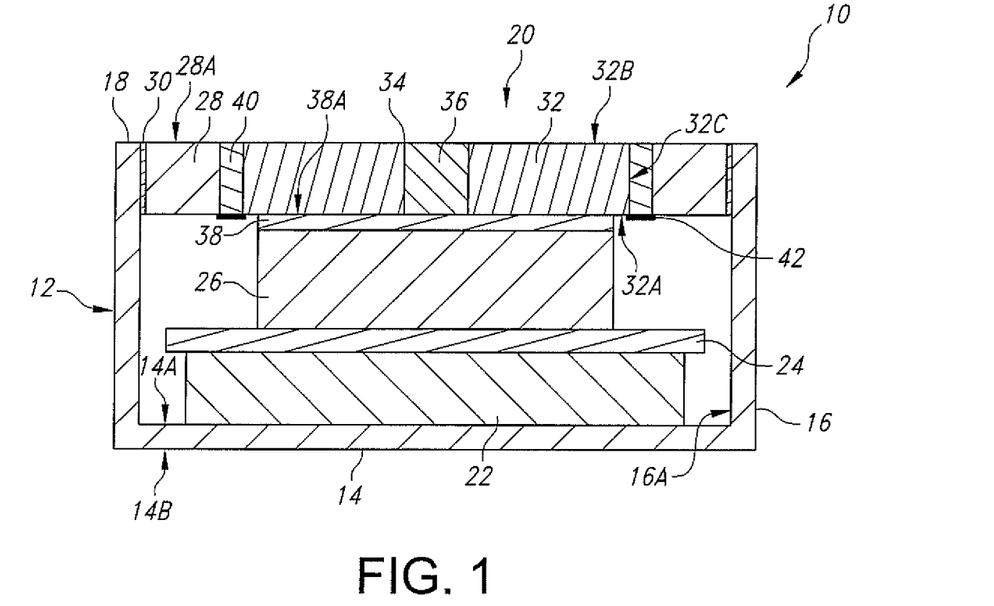
FIG. 1 is a cross-sectional view of one embodiment of a miniature electrochemical cell 10 according to the present invention.

Referring now to the drawings, FIG. 1 illustrates a first embodiment of a miniature electrochemical cell 10 according to the present invention. The cell 10 has a casing comprising an open-ended container 12 of an electrically conductive material, for example, titanium. The container 12 comprises a bottom wall 14 supporting an upwardly extending annular sidewall 16. The sidewall 16 extends to an upper edge 18 surrounding an open end opposite the bottom wall 14. The open end of the container 12 is closed with a header assembly 20 comprising a ceramic plate providing a feedthrough to thereby provide the cell casing.

The bottom wall 14 of the open-ended container 12 has an inner surface 14A and an outer surface 14B, which are substantially co-planar. The design of the bottom wall 14 in plan-view is not limited to any particular shape; it can have a curved annular shape or a rectangular shape comprising front and back edges meeting right and left edges. However, as those skilled in the art will readily recognize, a myriad of different shapes are contemplated for the bottom wall 14 of the open-ended container 12, the specific shape being limited only by the form factor for the application or device that the cell 10 is intended to power. In that respect, a cross-section of the sidewall 16 has the same shape as that of the bottom wall 14.

The electrode assembly of the electrochemical cell 10 comprises a body of anode active material 22 seated against the inner surface 14A of the bottom wall 14 of the container 12. While the anode active material 22 in the form of a disc or plate is shown as fitting inside the container 12 without contacting the annular sidewall 16, that is not necessary. Instead, since the container 12 is of an electrically conductive material, the container contacting the anode 22 serves as the negative terminal for the cell 10.

A layer of separator material 24 is positioned on the anode active material 22 opposite the container bottom wall 14. The separator 24 does not contact the annular sidewall 16 of the container 12, but that is also not necessary. As an electrochemically inactive material, should the separator contact the container, a short circuit condition would not result.

Then, a disc or plate of cathode active material 26 is contacted to the separator 24, opposite the anode active material 22. That way, the separator 24, in direct contact with the anode active material 22 and the cathode active material 26, prevents direct physical contact between the opposite polarity active materials while allowing for ionic transport and conductivity therebetween. An exemplary chemistry for the miniature electrochemical cell 10 shown in FIG. 1 has lithium as an exemplary anode active material 22, $LiCoO_2$ as a cathode active material 26, an alumina ceramic spacer or polyethylene as the separator 24, and a liquid electrolyte activates the $Li/LiCoO_2$ couple.

The header assembly 20 is preferably manufactured separately from the open-ended container 12. The header assembly 20 comprises an outer annular ring 28 of an electrically conductive metal, preferably of the same material as that of the container 12, for example titanium. The header assembly 20 is also comprised of a ceramic plate 32 of 3% YSZ or essentially high purity alumina ceramic of the chemical formula $Al_2O_3$. "Essentially pure" means that the post-sintered ceramic is at least 96% alumina up to 99.999% alumina. In various embodiments, the post-sintered ceramic plate 32 is at least 90% alumina, preferably at least 92% alumina, more preferably at least 94% alumina, and still more preferably at least 96% alumina.

The ceramic plate 32 is provided with a via hole 34 that extends to a plate inner surface 32A and a plate outer surface 32B. A platinum-containing fill material 36 fills the via hole 34 to thereby form an electrically conductive pathway extending between and to the inner and outer surfaces 32A, 32B of the ceramic plate 32. In one embodiment, the platinum-containing fill material 36 is a substantially closed pore, fritless and substantially pure platinum material. The platinum-containing fill material 36 hermetically sealed to the ceramic plate 32 has a leak rate that is not greater than $1 \times 10^{-7}$ std. cc He/sec.

In lieu of the pure platinum fill material, according to another embodiment of the present invention, the via hole is filled with a composite reinforced metal ceramic (CRMC) serving as the platinum-containing fill material 36. The CRMC material is a platinum-containing fill material that comprises, by weight %, from about 10:90 ceramic:platinum to about 90:10 ceramic:platinum or, from 70:30 ceramic: platinum to 30:70 ceramic:platinum.

Examples of suitable CRMC materials include, but are not limited to:

a) Alumina (Al$_2$O$_3$) or zirconia (ZrO$_2$) including various stabilized or partially stabilized zirconia like zirconia toughened alumina (ZTA) and alumina toughened zirconia (ATZ) with platinum (Pt) or palladium (Pd); and b) Alumina (Al$_2$O$_3$) or zirconia (ZrO$_2$) with iridium, rhenium, rhodium, various Pt alloys (e.g., Pt—Ir, Pt—Pd, Pt—Rh, Pt—Re, Pt—Au, Pt—Ag etc.), Pd alloys (e.g., Pd—Ir, Pd—Re, Pd—Rh, Pd—Ag, Pd—Au, Pd—Pt, Pd—Nb, etc.), Au alloys (e.g., Au—Nb, Au—Ti, etc.), Au alloys (e.g., Au—Nb, Au—Ti, etc.), and Ti alloys (e.g., Ti—Al—V, Ti—Pt, Ti—Nb, etc.).

Other non-limiting biocompatible metals and alloys that may be used in place of platinum include niobium, platinum/palladium, stainless steels, and titanium.

Furthermore any of the following materials may be used alone or in combination with any of the materials already discussed or within this list: gold (Au), silver (Ag), iridium (Ir), rhenium (Re), rhodium (Rh), titanium (Ti), tantalum (Ta), tungsten (W), zirconium (Zr), and vanadium (V); cobalt chromium molybdenum alloy, cobalt chromium nickel iron molybdenum manganese alloy, cobalt chromium tungsten nickel iron manganese alloy, cobalt nickel chromium iron molybdenum titanium alloy, cobalt nickel chromium iron molybdenum tungsten titanium alloy, cobalt nickel chromium molybdenum alloy, copper aluminum nickel alloy, copper zinc alloy, copper zinc aluminum nickel alloy, copper zinc silver alloy, gold platinum palladium silver indium alloy, iron chromium alloy, iron chromium nickel alloy, iron chromium nickel aluminum alloy, iron chromium nickel copper alloy, iron chromium nickel copper molybdenum niobium alloy, iron chromium nickel copper niobium alloy, iron chromium nickel copper titanium niobium alloy, iron chromium nickel manganese molybdenum alloy, iron chromium nickel molybdenum alloy, iron chromium nickel molybdenum aluminum alloy, iron chromium nickel titanium molybdenum alloy, iron manganese chromium molybdenum nitrogen alloy, nickel platinum alloy, nitinol, nickel titanium alloy, nickel titanium aluminum alloy, niobium-titanium alloy, platinum iridium alloy, platinum palladium gold alloy, titanium aluminum vanadium alloy, titanium based aluminum iron alloy, titanium based aluminum molybdenum zirconium alloy, titanium based molybdenum niobium alloy, titanium based molybdenum zirconium iron alloy, titanium based niobium zirconium alloy, titanium based niobium zirconium tantalum alloy, titanium molybdenum alloy, titanium niobium alloy, titanium platinum alloy, and titanium-based molybdenum zirconium tin alloy.

It is understood that throughout this disclosure when CRMC paste and pure platinum paste are referred to, those pastes include solvents and binders that will be baked out during sintering. Suitable binders are selected from the group consisting of ethyl cellulose, acrylic resin, polyvinyl alcohol, polyvinyl butyral and a poly(alkylene carbonate) having the general formula R—O—C(═O)—O with R=C1 to C5. Poly(ethylene carbonate) or poly(propylene carbonate) are preferred poly(alkylene carbonates). Suitable solvents are selected from the group consisting of terpineol, butyl carbitol, cyclohexanone, n-octyl alcohol, ethylene glycol, glycerol, water, and mixtures thereof.

The interfacial boundary between the ceramic plate 32 and the platinum-containing fill material 36 forms a meandering or undulating path of sufficient tortuosity such that the boundary inhibits crack initiation, and more importantly, crack propagation, and additionally, because of the intimacy of the interface, impairs leakage of fluids. As used herein, the word tortuous or tortuosity refers to the roughened, complex, or undulating interface that is formed at the boundary between the ceramic plate 32 and the platinum-containing fill material 36. This tortuous interface is characterized by hills and valleys which is topographically three dimensional and forms a very strong and reliable hermetic bond.

In an exemplary embodiment of the present invention, a method of manufacturing the hermetically sealed header 20 includes forming a ceramic plate 32 comprising at least 96% alumina; forming at least one via hole 34 extending through the ceramic plate 32; filling the at least one via hole 34 with an electrically conductive paste (not shown), the electrically conductive paste comprising a platinum-containing powder (either substantially pure platinum or CRMC) and an inactive organic binder, solvent, and/or plasticizer; placing the ceramic plate 32 and conductive paste into an air filled heating chamber and heating the assembly to form a monolithic structure. It is believed that the platinum fill material 36 resulting from the sintered conductive paste and the ceramic plate 32 forms an interface comprising a glass that is at least about 60% silica.

In another exemplary embodiment, forming the plate-shaped ceramic plate 32 comprises laminating a plurality of ceramic sheets together.

A cathode current collector 38 is then contacted to the inner surface 32A of the ceramic plate 32 using physical vapor deposition (PVD). Prior to deposition, however, the ceramic plate 32 is lapped and polished with a slurry or ceramic coated grinding paper followed by diamond polishing to a smooth surface finish having a surface roughness of less than 10 nm.

While not shown in the drawing, an outer metallization comprising an adhesion metallization is contacted to the outer circumferential surface 32C of the ceramic plate 32. A wetting metallization is disposed on the adhesion metallization. A gold-braze 40 then hermetically seals the ceramic plate 32 to the outer annular ring 28. The hermetic gold-braze 40 between the outer annular ring 28 and the wetting metallization contacting the adhesion metallization contacting the ceramic plate 32 has a leak rate that is not greater than $1 \times 10^{-7}$ std. cc He/sec.

Then, after an activating electrolyte (not shown) is filled into the container 12, the ceramic plate 32 connected to annular ring 28 by gold braze 40 is positioned inside the inner surface 16A of the upwardly extending annular sidewall 16 of the open-end container. The annular ring 28 is hermetically secured to the sidewall 16 with a weld 30, preferably a laser weld. In this position, an upper surface 28A of the annular ring 28 is substantially co-planar with the upper edge 18 of the annular sidewall 16.

To isolate the braze 40 from the electrolyte to prevent possible corrosion of the gold, a titanium coating 42 about 0.5 μm to 50 μm thick, preferably deposited using a PVD process, covers the gold but does not contact the cathode current collector 38. This coating 42 is preferably applied at the same time as the cathode current collector 38 by coating the inner surface 32A of the ceramic plate 32 at the gold braze 40.

With the annular ring 28 supporting the ceramic plate 32 welded to the open end of the metallic container 12, the cathode current collector 38 is seated against the cathode active material 26 opposite the separator 24 and spaced from the sidewall 16 of the open-ended container 12. An upper surface 38A of the cathode current collector 38 is in electrical continuity with the platinum-containing fill material 36 in the via hole 34. The current collector is also in electrical continuity with the cathode active material 26.

In the present electrochemical cell 10, to achieve sustainable hermeticity between the platinum-containing fill material 36 and the ceramic plate 32, the following is required. Because the CTE of platinum is sufficiently higher than the CTE of alumina, it is not theoretically possible for alumina to provide compressive forces on a solid platinum body, for example a solid platinum wire, residing in a via hole extending through alumina. To overcome the CTE differences between these two materials, a platinum body residing in an alumina via hole must be formed using a platinum paste having a minimum of 80% platinum solids loading. The term "paste" is defined as a smooth, soft mass having a pliable consistency and comprising pure platinum particles, a binder material and a solvent. In a preferred embodiment, the solids loading of platinum particles in the paste is about 90%. In a more preferred embodiment, the solids loading of platinum particles in the paste is about 95%.

In addition, the via hole 34 must be packed so that the platinum paste occupies at least about 90% of its available space. In a preferred embodiment, the platinum paste occupies about 95% of the via hole space. In a more preferred embodiment, the platinum paste occupies about 99% of the via hole 34 space.

The shrinkage of the alumina must be no greater than about 20% of that of the volume of the platinum paste in the via hole 34. In a preferred embodiment, shrinkage of the alumina is about 14% of that of the volume of the platinum paste in the via hole 34. In a more preferred embodiment, shrinkage of the alumina is about 16% of that of the volume of the platinum paste in the via hole 34.

After the platinum-containing paste is filled into the via hole 34 extending through the ceramic plate 32, the ceramic plate is exposed to a controlled co-firing heating profile in ambient air that comprises a binder bake-out portion, a sinter portion and a cool down portion.

In one embodiment, the binder bake-out portion of the controlled co-firing heating profile is performed at a temperature of from about 400° C. to about 700° C. for a minimum of about 4 hours. A preferred binder bake-out protocol is performed at a temperature of from about 550° C. to about 650° C. A more preferred binder bake-out is performed at a temperature of from about 500° C. to about 600° C.

Next, the sintering profile portion of the controlled co-firing heating profile is preferably performed at a temperature ranging from about 1,400° C. to about 1,900° C. for up to about 6 hours. A preferred sintering profile is at a temperature from about 1,500° C. to about 1,800° C. A more preferred sintering temperature is from about 1,600° C. to about 1,700° C.

Then, the cool down portion of the controlled co-firing heating profile occurs either by turning off the heating chamber and allowing the chamber to equalize to room temperature or, preferably by setting the cool down portion at a rate of up to about 5° C./min from the hold temperature cooled down to about 1,000° C. At about 1,000° C., the chamber is allowed to naturally equalize to room temperature. A more preferred cool down is at a rate of about 1° C./min from the hold temperature to about 1,000° C. and then allowing the heating chamber to naturally equalize to room temperature. In so doing, a robust hermetic seal is achieved between the mating materials of the ceramic substrate or plate 32 and platinum-containing fill material 36 in the via hole 34.

During processing, compression is imparted by the ceramic plate 32 around the platinum-containing paste in the via hole 34 due to volume shrinkage of the alumina being greater than that of the paste. Furthermore, the platinum is sufficiently malleable at this phase to favorably deform by the compressive forces applied by the ceramic plate 32. The combination of the platinum solids loading in the paste, the platinum packing in the via hole 34 and the shrinkage of the ceramic plate being greater than that of the platinum-containing paste as the paste is solidified to a solid platinum fill material results in the platinum taking the shape of the mating alumina surface. The amount of platinum solids loading, its packing percentage in the via hole 34 and the malleability of the platinum material all contribute to formation of a hermetic seal between the platinum fill material 36 and the ceramic plate 32. In addition, the compressive forces that result from the greater volumetric shrinkage of the ceramic substrate or plate 32 than that of the platinum-containing fill material 36 in the via hole 34 limit expansion of the platinum and force the platinum to deform to the contour of the surface of the via hole 34 to consequently form a hermetic seal. Thus, an interface between the ceramic plate 32 and the platinum-containing fill material 36 that conforms to the respective interface surfaces and results in a nearly exact mirror image of the interfacing surfaces is formed, thereby creating a hermetic bond therebetween.

While the above discussion regarding the controlled co-firing heating profile has been presented with respect to an alumina ceramic, it is believed that 3% YSZ ceramic will function in a similar manner.

Analysis of the interface between the ceramic plate 32 and the platinum-containing fill material 36 of this invention showed not only the creation of an intimate interface, but, in the case of the interfacial layer, a hermetic structure that exhibits an amorphous layer at the interface comprising the elements platinum, aluminum, carbon and oxygen that appear to impart resistance to erosion by body fluids. Both these bonding mechanisms, direct bonding and an amorphous interfacial layer, offer additional tolerance to the CTE mismatch between the ceramic plate 32 and the platinum-containing fill material 36.

Figure 2:
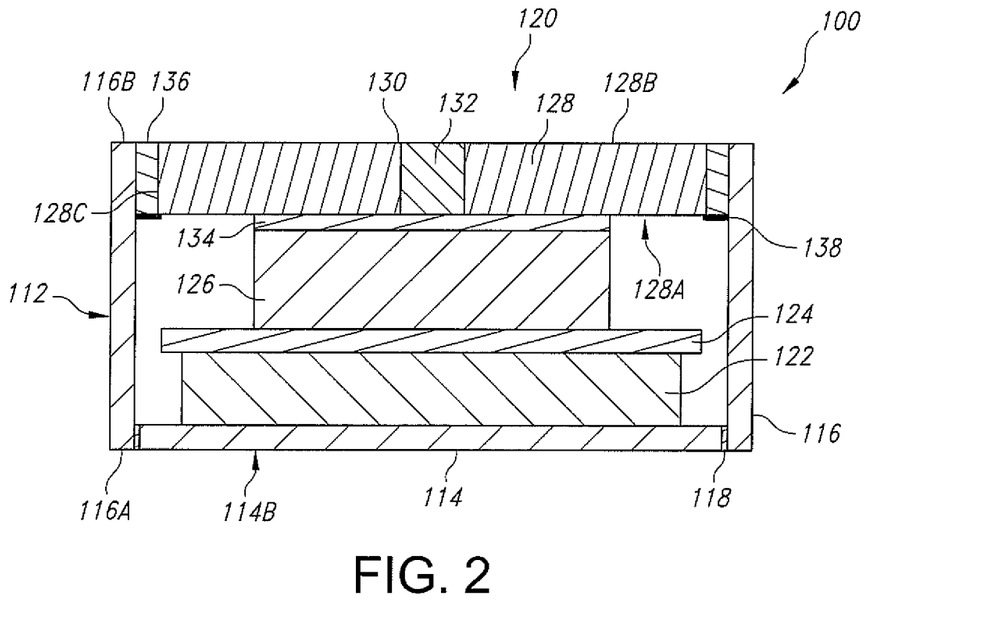
FIG. 2 is a cross-sectional view of another embodiment of a miniature electrochemical cell 100 according to the present invention.

FIG. 2 illustrates another embodiment of a miniature electrochemical cell 100 according to the present invention. Electrochemical cell 100 is similar to the cell 10 illustrated in FIG. 1 and has a casing comprising an open-ended container 112 of an electrically conductive material, for example, titanium. The shape of container 112 is not limited to any form or design. Instead, the specific shape is dictated by the form factor for the application or device that the cell 100 is intended to power.

The container 112 comprises a bottom wall 114 that is hermetically connected to an annularly-shaped, preferably cylindrically-shaped, sidewall 116 by an annular weld 118. A lower surface 114A of the bottom wall 114 is coplanar with a lower edge 116A of the annular sidewall 116. The sidewall 116 extends to an upper edge 116B surrounding an open end opposite the bottom wall 114. The open end of the container 112 opposite the bottom wall 114 is closed with a header assembly 120 to thereby provide the cell casing.

The electrode assembly of the electrochemical cell 100 comprises a body of anode active material 120 seated against an inner surface 114B of the container bottom wall 114. The anode active material 122 is in the form of a disc or plate that is sized and shaped to fit inside the container 112 without contacting the annular sidewall 116. While the anode active material 122 is shown as fitting inside the container 112 without contacting the annular sidewall 116, that is not necessary. The container 112 being of an electrically conductive material contacting the anode 122 serves as the negative terminal for the cell 200. This means that the anode active material 122 could contact the annular sidewall 116 with establishing a short-circuit condition.

A layer of separator material 124 is positioned on the anode active material 122 opposite the bottom wall 114 of the container 112. The separator 124 is shown not contacting the annular sidewall 116 of the container 112, but that is also not necessary. As an electrochemically inactive material, should the separator 124 contact the container 112, a short circuit condition would not result.

A disc or plate of cathode active material 126 is contacted to the separator 124, opposite the anode active material 122. The separator 124 in direct contact with the anode and cathode active materials 122, 126 prevents direct physical contact between the opposite polarity active materials while allowing for ionic transport and conductivity therebetween.

An exemplary chemistry for the miniature electrochemical cell 100 shown in FIG. 2 has lithium as an anode active material 122, $LiCoO_2$ as a cathode active material 126, an alumina ceramic spacer or polyethylene serves as the separator 124, and a liquid electrolyte (not shown) activates the $Li/LiCoO_2$ couple.

The header assembly 120 is comprised of a plate 128 of 3% YSZ or essentially high purity alumina ceramic of the chemical formula $Al_2O_3$. The ceramic plate 128 is provided with a via hole 130 that extends to a plate inner surface 128A and a plate outer surface 128B. A platinum-containing fill material 132 being either a substantially closed pore, fritless and substantially pure platinum material or a CRMC material fills the via hole 130 to thereby form an electrically conductive pathway extending between and to the inner and outer surfaces 128A, 128B of the ceramic plate 128. The platinum-containing fill material 132 resulting from the sintered conductive paste and the ceramic plate 128 forms an interface comprising a glass that is at least about 60% silica and has a leak rate that is not greater than $1\times10^{-7}$ std. cc He/sec.

A cathode current collector 134 is contacted to the inner surface 128A of the ceramic substrate or plate 128 using physical vapor deposition (PVD). Prior to deposition, however, the ceramic plate 128 is lapped and polished with a slurry or ceramic coated grinding paper followed by diamond polishing to a smooth surface finish having a surface roughness of less than 10 nm.

While not shown in FIG. 2, an outer metallization comprising an adhesion metallization is contacted to the outer circumferential surface 128C of the ceramic plate 128. A wetting metallization is disposed on the adhesion metallization. A gold-braze 136 then directly seals the ceramic plate 128 to the sidewall 116 of container 112 adjacent to edge 116B. The hermetic gold-braze 136 between the container sidewall 116 and the wetting metallization contacting the adhesion metallization contacting the ceramic plate 128 has a leak rate that is not greater than $1\times10^{-7}$ std. cc He/sec.

To isolate the braze 136 from the electrolyte to prevent possible corrosion of the gold, a titanium coating 138 about 0.5 µm to 50 µm thick, preferably deposited using a PVD process, covers the gold but does not contact the cathode current collector 134. This coating 138 is preferably applied at the same time as the cathode current collector 134 by coating the inner surface 128A of the ceramic plate 128 at the gold braze 136.

To build the electrochemical cell 100, header assembly 120 comprising the ceramic plate 128 with the platinum fill material 132 hermetically sealing the via hole 130 is sealed to the container sidewall 116 by means of the gold braze 136. A suitable metallization resides between the gold braze 136 and the outer annular edge of the ceramic plate 128. The cathode current collector 134 is then deposited on the inner surface 128A of the ceramic plate by a suitable PVD process. The cathode active material 126 followed by the separator 124 followed by the anode active material 122 is then positioned inside the container sidewall 116. An activating electrolyte (not shown) is filled into the container followed by the bottom wall 114 being secured to the sidewall 116 by weld 118 to seal the casing and thereby provide a functioning electrochemical cell 100.

Thus, the significant differences between the electrochemical cell 10 shown in FIG. 1 and the cell 100 illustrated in FIG. 2 is that the former has the metal annular ring, for example of titanium, welded to the sidewall 16 of the container 12 while the latter cell has a larger ceramic plate or substrate 128 that is hermetically connected to the container sidewall 116 by gold braze 136. Further, the open-ended container 12 for the electrochemical cell 10 is a unitary member comprising the bottom wall 14 supporting the sidewall 16. In contrast, the container 112 of the electrochemical cell 100 of FIG. 2 comprises a bottom plate 114 connected to the annular sidewall 116 by weld 118. Otherwise, the respective cells 10, 110 are of similar constructions.

Figure 3:
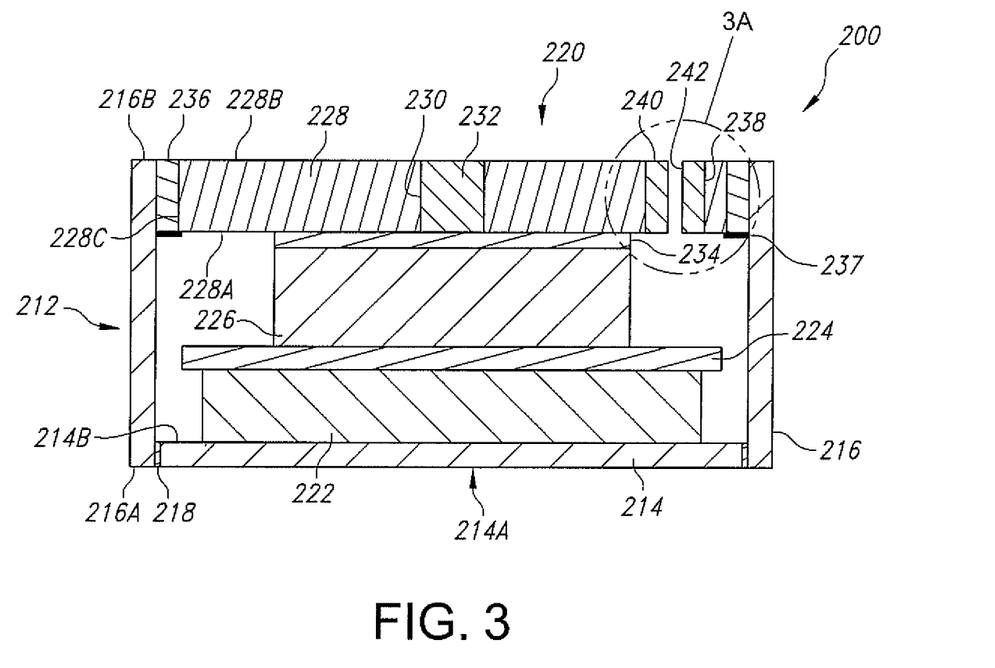
FIG. 3 is a cross-sectional view of another embodiment of a miniature electrochemical cell 200 according to the present invention.

FIG. 3 illustrates another embodiment of a miniature electrochemical cell 200 according to the present invention. Electrochemical cell 200 is similar to the cell 100 illustrated in FIG. 2, but with the addition of an electrolyte fill port, which will be described in detail hereinafter.

Electrochemical cell 200 has a casing comprising an open-ended container 212 of an electrically conductive material, for example, titanium. As with the respective containers 12 and 112 of cells 10 and 100, the shape of container 212 is not limited to any particular form or design. The container 212 comprises a bottom wall 214 that is hermetically connected to an annularly-shaped, preferably cylindrically-shaped, sidewall 216 by an annular weld 218. A lower surface 214A of the bottom wall 214 is coplanar with a lower edge 216A of the annular sidewall 216. The sidewall 216 extends to an upper edge 216B surrounding an open end opposite the bottom wall 214. The open end of the container 212 opposite the bottom wall 214 is closed with a header assembly 220 to thereby provide the cell casing.

The electrode assembly of the electrochemical cell 200 comprises a body of anode active material 222 seated against an inner surface 214B of the container bottom wall 214. Since the container 212 is of an electrically conductive material, the container contacting the anode 222 serves as the negative terminal for the cell 220. While the anode active material 222 in the form of a disc or plate is shown as fitting inside the container 212 without contacting the annular sidewall 216, that is not necessary. Instead, since the container 212 is of an electrically conductive material, the container contacting the anode 222 serves as the negative terminal for the cell 200.

A layer of separator material 224 is positioned on the anode active material 222 opposite the bottom wall 214 of the container 212. The separator 224 is shown not contacting the annular sidewall 216 of the container 212, but that is also not necessary. As an electrochemically inactive material, should the separator 224 contact the container, a short circuit condition would not result.

A disc or plate of cathode active material 226 is contacted to the separator 224, opposite the anode active material 222. The cathode active material 226 is spaced inwardly from the annular sidewall 216. Thus, the separator 224 in direct contact with the anode and cathode active materials 222, 226 prevents direct physical contact between the opposite polarity active materials while allowing for ionic transport and conductivity therebetween. An exemplary chemistry for the miniature electrochemical cell 200 shown in FIG. 3 has lithium as the anode active material 222, $LiCoO_2$ as the cathode active material 226, and an alumina ceramic spacer or polyethylene serves as the separator 224. A liquid electrolyte activates the $Li/LiCoO_2$ couple.

The header assembly 220, which is manufactured separately from the casing comprising the bottom wall 214 welded to the annularly-shaped container 212, is comprised of a plate 228 of 3% YSZ or essentially high purity alumina ceramic of the chemical formula $Al_2O_3$. The ceramic plate 228 is provided with a via hole 230 that extends from a plate inner surface 228A to a plate outer surface 228B. A platinum-containing fill material 232 being either a substantially closed pore, fritless and substantially pure platinum material or a CRMC material fills the via hole 230 to thereby form an electrically conductive pathway extending between and to the inner and outer surfaces 228A, 228B of the ceramic plate 228. The platinum-containing fill material 232 resulting from the sintered conductive paste and the ceramic plate 228 forms an interface comprising a glass that is at least about 60% silica and has a leak rate that is not greater than $1 \times 10^{-7}$ std. cc He/sec.

A cathode current collector 234 is then contacted to the inner surface 228A of the ceramic substrate or plate 228 using physical vapor deposition (PVD). Prior to deposition, however, the ceramic plate 228 is lapped and polished with a slurry or ceramic coated grinding paper followed by diamond polishing to a smooth surface finish having a surface roughness of less than 10 nm.

An outer metallization (not shown) comprising an adhesion metallization is contacted to the outer circumferential surface 228C of the ceramic plate 228. A wetting metallization is disposed on the adhesion metallization. An annular gold-braze 236 then directly seals the ceramic plate 228 including the outer metallization to the container sidewall 216. The hermetic gold-braze 236 sealing between the wetting metallization contacting the adhesion metallization contacting the ceramic plate 228 has a leak rate that is not greater than $1 \times 10^7$ std. cc He/sec.

To isolate the braze 236 from the electrolyte to prevent possible corrosion of the gold, a titanium coating 237 about 0.5 μm to 50 μm thick, preferably deposited using a PVD process, covers the gold but does not contact the cathode current collector 234. This coating 237 is preferably applied at the same time as the cathode current collector 234 by coating the inner surface 228A of the ceramic plate 228 at the gold braze 236.

To build the electrochemical cell 200, header assembly 220 comprising the ceramic plate 228 with the platinum-containing fill material 232 hermetically sealing the via hole 230 is sealed to the container sidewall 216 by means of the gold braze 236. A suitable metallization resides between the gold braze 236 and the outer annular edge of the ceramic plate 228. The cathode current collector 234 is then deposited on the inner surface 228A of the ceramic plate by a suitable PVD process. The cathode active material 226 followed by the separator 224 followed by the anode active material 222 is then positioned inside the container sidewall 216. Next, the bottom wall 214 is secured to the sidewall 216 by weld 218 to seal the casing.

The ceramic plate 228 of header assembly 220 is further provided with a second via hole 238 that extends to the plate inner and outer surfaces 228A, 228B. The second via hole 238 is filled with a platinum-containing fill material 240 comprising either a substantially closed pore, fritless and substantially pure platinum fill material or CRMC material that is similar to the platinum-containing fill material 232 residing in the first via hole 230. In that respect, the platinum-containing fill material 240 in the second via hole 238 is formed from a platinum-containing paste (not shown) that is subjected to a controlled co-firing heating profile in ambient air that comprises a binder bake-out portion, a sinter portion and a cool down portion. This co-firing heating protocol, which is similar to that described above with respect to the platinum pastes in via holes 34 and 130 of respective electrochemical cells 10 and 100, is preferably performed at the same time that the platinum-containing paste in via hole 230 is transformed into the platinum-containing fill material 232 and serves to transform the platinum-containing paste into the solidified platinum-containing fill material 240. A hermetic seal having a leak rate that is not greater than $1 \times 10^{-7}$ std. cc He/sec is provided in the second via hole 238 between the platinum-containing fill material 240 sealing to the ceramic plate 228.

Figure 3A:
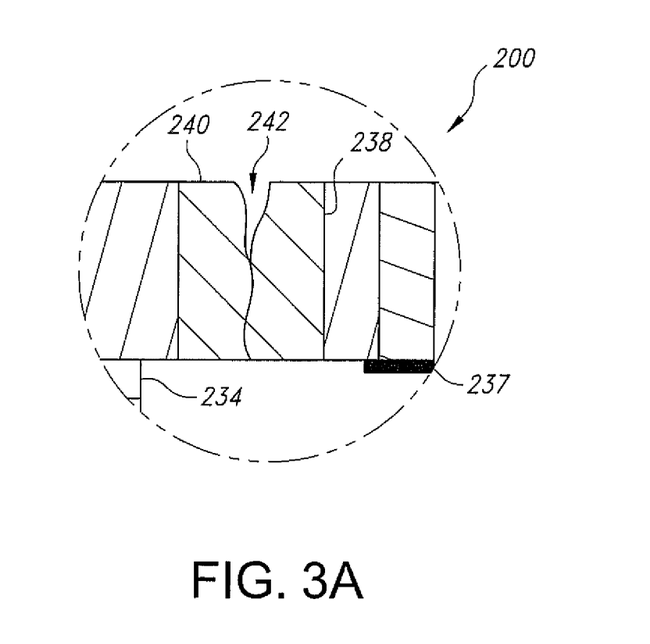
FIG. 3A is an enlarged view of the designated section of FIG. 3 showing the electrolyte fill port 242 after the platinum fill material 240 has been welded closed.

After the bottom plate 214 is secured to the sidewall 216 with the header assembly 220 closing the opposite end of the container sidewall, the platinum-containing fill material 240 is subjected to a drilling operation. Drilling serves to remove a cylinder of the fill material so that an annular sleeve of the platinum-containing material serving as a fill port 242 is left in the via hole 238. A liquid electrolyte (not shown) is then filled into the interior of the cell 200 through the fill port 242 of platinum to activate the electrode assembly comprising the anode active material 222 spaced from the cathode active material 226 by the intermediate separator 224. As shown in FIG. 3A, after electrolyte filling is completed, the fill port 242 of platinum-containing material is closed. A preferred closure technique is to melt the platinum 240 with a laser beam.

Thus, the significant differences between the electrochemical cell 100 shown in FIG. 2 and the cell 200 illustrated in FIG. 3 is that the provision of the electrolyte fill port 242. The fill port 242 provides for activating the electrode assembly of the anode active material 222 and the cathode active material 226 with a liquid electrolyte. Otherwise, the respective cells 10, 100 and 200 are of similar constructions. This includes the use of a metal container 12, 112 and 212 closed by a header assembly 20, 120 and 220. Further, the ceramic plates 32, 128 and 228 of the respective header assemblies are each provided with a via hole 34, 130 or holes 230 and 238 that are first filled with a platinum-containing paste and the paste is then subjected to a controlled co-firing heating profile that serves to transform the paste into the solidified platinum-containing fill materials 36, 232, 232 and 240. A hermetic seal having a leak rate that is not greater than $1 \times 10^{-7}$ std. cc He/sec is provided in the via holes 34, 130, 230 and 238 between the platinum-containing fill material 36, 132, 232 and 240 sealing to the respective ceramic plates 32, 128 and 228.

Moreover, while the respective ceramic plates 28 and 128 of cells 10 and 100 are not shown with a fill port similar to the port 242 of cell 200 illustrated in FIGS. 3 and 3A, that is not intended to be limiting. The skilled artisan will readily recognize that it is within the scope of the preset invention that the ceramic plates 28 and 128 can be provided with a second via hole having a platinum-containing fill material sealed therein. As with the platinum-containing fill material 240 in the via hole 238 of the ceramic plate 228, that fill material is drilled to provide a sleeve for filling electrolyte into the casing followed by heating the platinum-containing material to seal the cell 10, 100.

An exemplary chemistry for the miniature electrochemical cells 10, 100 and 200 shown in FIGS. 1 to 3 has lithium as an exemplary anode active material, $LiCoO_2$ as a cathode active material, the separator is of an alumina ceramic spacer or polyethylene, and a liquid electrolyte activates the Li/$LiCoO_2$ couple. However, in a broader sense, the miniature electrochemical cells 10, 100 and 200 can be of either a primary or a secondary chemistry. If a primary chemistry, the anode can comprise metals capable of alloying with lithium at potentials below 1.0 V vs. lithium such as Sn, Si, Al, B, Si—B, and composites of those metals with inactive metals to reduce volume expansion. The form of the anode may vary, but preferably it is of a thin sheet or foil that contacts the respective bottom walls 14, 114 and 214 so that the metallic containers 12, 112 and 212 serve as the anode terminal for the cells 10, 100 and 200.

The cathode of a primary cell is of electrically conductive material, preferably a solid material. The solid cathode may comprise a metal element, a metal oxide, a mixed metal oxide, and a metal sulfide, and combinations thereof. A preferred cathode active material 26, 126 and 226 is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, carbon monofluoride, and mixtures thereof.

Before fabrication into an electrode for incorporation into an electrochemical cell, however, the cathode active material 26, 126 and 226 is mixed with a binder material such as a powdered fluoro-polymer, more preferably powdered polytetrafluoroethylene or powdered polyvinylidene fluoride (PVDF) present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture for the electrochemical cells 10, 100 and 200 thus includes a powdered fluoro-polymer binder present at about 3 weight percent, a conductive diluent present at about 3 weight percent, and about 94 weight percent of the cathode active material.

The primary electrochemical cells 10, 100 and 200 include a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

In the exemplary secondary electrochemical cells 10, 100 and 200, in addition to lithium, the anode active materials 22, 122 and 222 can comprise a material capable of intercalating and de-intercalating an alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties that permit them to be fabricated into rigid electrodes capable of withstanding degradation during repeated charge/discharge cycling.

The cathode active materials 26, 126 and 226 of the exemplary secondary electrochemical cells 10, 100 and 200 preferably comprise a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

For electrochemical cells 10, 100 and 200, the lithiated active material is preferably mixed with a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof.

The current collectors 38, 134 and 234 are selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable secondary electrochemical systems for cells 10, 100 and 200 are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and mixtures thereof, and at least one cyclic carbonate selected from propylene carbonate (PC), ethylene carbonate (EC), butylene carbonate (BC), and vinylene carbonate (VC), and mixtures thereof. Organic carbonates are generally used in the electrolyte solvent system for such battery chemistries because they exhibit high oxidative stability toward cathode materials and good kinetic stability toward anode materials.

In addition to titanium, suitable materials for the cell casing include stainless steel, mild steel, nickel-plated mild steel, tantalum, and aluminum, but not limited thereto, so long as the metallic material is compatible for use with the other cell components.

Thus, the open-ended containers 12, 112 and 212 for the respective electrochemical cells 10, 100 and 200 of the present invention preferably have diameters that are less 1 cm and heights that are less than 2 mm. More preferably, total cell volume for the cells is less than 0.5 cc. Constructing them from a metal open-ended container closed by a header comprising a ceramic plate enables such miniature electrochemical cells.

Now, it is therefore apparent that the present invention relates to various embodiments for miniature electrochemical cells having a total volume of less than 0.5 cc. Moreover, while embodiments of the present invention have been described in detail, such is for the purpose of illustration, not limitation.

What is claimed is:

1. An electrochemical cell, comprising:
    a) a casing, comprising:
        i) an open-ended container of an electrically conductive material;
        ii) a ceramic plate closing the open-ended container, the ceramic plate having a ceramic plate inner surface opposite a ceramic plate outer surface; and
        iii) an electrically conductive pathway comprising a first platinum-containing material residing in a first via hole extending through the ceramic plate, the first conductive pathway having a first conductive pathway inner surface located at the ceramic plate inner surface and a first conductive pathway outer surface located at or adjacent to the ceramic plate outer surface, wherein the first conductive pathway outer surface is configured for electrical connection to a load;
    b) an electrode assembly, comprising:
        i) an anode active material contacting the electrically conductive container;
        ii) a cathode current collector directly contacting the inner surface of the ceramic plate at the first via hole so that the cathode current collector is in an electrically conductive relationship with the first conductive pathway;
        iii) a cathode active material contacting the cathode current collector opposite the ceramic plate; and
        iv) a separator disposed between the anode and cathode active materials; and
    c) an electrolyte in the casing in contact with the electrode assembly.

2. The electrochemical cell of claim 1, wherein the ceramic plate is selected from alumina and 3% YSZ.

3. The electrochemical cell of claim 1, wherein an annular metallic ring is welded to the container at the open end thereof, and wherein the ceramic plate is brazed to the metallic ring to thereby close the container.

4. The electrochemical cell of claim 3, wherein the electrolyte is prevented from contacting the gold braze by a coating of titanium applied to at least an inner surface of the gold braze.

5. The electrochemical cell of claim 1, wherein the ceramic plate is directly secured to the container at the open end thereof by an intermediate gold braze to thereby close the container.

6. The electrochemical cell of claim 5, wherein the electrolyte is prevented from contacting the gold braze by a coating of titanium applied to at least an inner surface of the gold braze.

7. The electrochemical cell of claim 1, wherein the first electrically conductive pathway comprises substantially pure platinum disposed in the first via hole in a sealed relationship with the ceramic plate.

8. The electrochemical cell of claim 1, wherein the first platinum-containing material is comprised of, by weight %, from 10:90 ceramic:platinum to 90:10 ceramic:platinum.

9. The electrochemical cell of claim 8, wherein the ceramic in the first platinum-containing material is either 3% YSZ or alumina, and mixtures thereof.

10. The electrochemical cell of claim 1, wherein the cathode current collector contacted to the inner surface of the ceramic plate at the first via hole prevents the electrolyte from contacting the first conductive pathway residing in the first via hole extending through the ceramic plate.

11. The electrochemical cell of claim 1, wherein a second platinum-containing material is disposed in a second via hole extending through the ceramic plate, and wherein the second platinum-containing material is characterized as having been partially removed to form a second platinum-containing material sleeve serving as an electrolyte fill port, and the second platinum-containing material sleeve is characterized as having been melted to close the sleeve after the electrolyte is provided in the casing.

12. The electrochemical cell of claim 1, wherein the electrode assembly is of either a $Li/LiCoO_2$ or $Li/LiNi_aMn_bCo_{1-a-b}O_2$ couple.

13. The electrochemical cell of claim 1, being of either a primary or a secondary chemistry.

14. The electrochemical cell of claim 1, wherein the inner surface of the ceramic plate has a surface roughness of less than 10 nm.

15. An electrochemical cell, comprising:
    a) a casing, comprising:
        i) an open-ended container of an electrically conductive material;
        ii) a ceramic plate closing the open-ended container, the ceramic plate having a ceramic plate inner surface opposite a ceramic plate outer surface; and
        iii) a first electrically conductive pathway comprising a first electrically conductive material and a second electrically conductive pathway comprising a second electrically conductive material, the first and second electrically conductive pathways residing in respective first and second via holes extending through the ceramic plate, at least the first conductive pathway having a first conductive pathway inner surface located at the ceramic plate inner surface and a first conductive pathway outer surface located at or adjacent to the ceramic plate outer surface, wherein the outer surface of the first conductive pathway is configured for electrical connection to a load;
    b) an electrode assembly, comprising:
        i) an anode active material contacting the electrically conductive container;
        ii) a cathode current collector directly contacting an inner surface of the ceramic plate at the first via hole so that the cathode current collector is in an electrically conductive relationship with the first conductive pathway;
        iii) a cathode active material contacting the cathode current collector opposite the ceramic plate; and
        iv) a separator disposed between the anode and cathode active materials; and
    c) an electrolyte in the casing in contact with the anode and cathode active materials,
    d) wherein the second platinum-containing material comprising the second conductive pathway disposed in the second via hole extending through the ceramic plate is characterized as having been partially removed to form a second platinum-containing material sleeve serving as an electrolyte fill port, and the second platinum-containing material sleeve is further characterized as having been melted to close the sleeve after the electrolyte is provided in the casing.

16. The electrochemical cell of claim 15, wherein the ceramic plate is selected from alumina and 3% YSZ.

17. The electrochemical cell of claim 15, wherein an annular metallic ring is welded to the container, and wherein the ceramic plate is brazed to the metallic ring to thereby close the open end of the container.

18. The electrochemical cell of claim 15, wherein the ceramic plate is directly secured to the container by an intermediate gold braze to thereby close the open end thereof.

19. The electrochemical cell of claim 15, wherein the first and second electrically conductive pathways each comprise substantially pure platinum disposed in the respective first and second via holes in a sealed relationship with the ceramic plate.

20. The electrochemical cell of claim 15, wherein the inner surface of the ceramic plate has a surface roughness of less than 10 nm.

21. A method for providing an electrochemical cell, comprising the steps of:
   a) providing an open-ended container of an electrically conductive material;
   b) providing a ceramic plate that is configured to close the open-ended container, the ceramic plate having a ceramic plate inner surface opposite a ceramic plate outer surface;
   c) providing a first via hole extending through the ceramic plate to the inner and outer surfaces; and
   c) filling a first platinum-containing paste into the first via hole and then heating the ceramic plate to transform the first paste into a first platinum-containing material hermetically sealed to the ceramic plate in the first via hole, wherein the first platinum-containing material comprises a first platinum-containing material inner surface located at the ceramic plate inner surface and a first platinum-containing material outer surface located at or adjacent to the ceramic plate outer surface;
   d) disposing an electrode assembly inside the open-ended container, the electrode assembly comprising:
      i) contacting an anode active material to the electrically conductive open-ended container;
      ii) directly contacting a cathode current collector to an inner surface of the ceramic plate at the first via hole so that the cathode current collector is in an electrically conductive relationship with the first platinum-containing material extending through the first via hole;
      iii) contacting a cathode active material to the cathode current collector opposite the ceramic plate; and
      iv) disposing a separator between the anode and cathode active materials; and
   e) providing an electrolyte in the casing in contact with the electrode assembly; and
   f) securing the ceramic plate to the open end of the container to close the container and thereby house the electrode assembly in a sealed casing comprising the container and the ceramic plate,
   g) wherein the first platinum-containing material outer surface is configured for electrical connection to a load.

22. The method of claim 21, including welding an annular metallic ring to the container at the open end thereof, and further securing the ceramic plate to the metallic annular ring by a gold braze to thereby close the container.

23. The method of claim 22, including applying a coating of titanium to at least an inner surface of the gold braze to thereby prevent the electrolyte from contacting the gold braze.

24. The method of claim 21, including hermetically securing the ceramic plate directly to the container by an intermediate gold braze to thereby close the open end thereof.

25. The method of claim 24, including applying a coating of titanium to at least an inner surface of the gold braze to thereby prevent the electrolyte from contacting the gold braze.

26. The method of claim 21, including, with the first platinum-containing paste filled into the first via hole in the ceramic plate, subjecting the ceramic plate to a heating profile that comprises a binder bake-out portion, a sinter portion and a cool down portion to transform the paste into the first platinum-containing material hermetically sealed to the ceramic plate in the via hole.

27. The method of claim 26, including subjecting the ceramic plate to the heating profile in an ambient atmosphere.

28. The method of claim 21, including providing:
   a) a second via hole extending through the ceramic plate to the ceramic plate inner and outer surfaces;
   b) filling a second platinum-containing paste into the second via hole and then heating the ceramic plate to transform the second paste into a second platinum-containing material hermetically sealed to the ceramic plate in the second via hole;
   c) drilling out a portion of the second platinum-containing material in the second via hole to thereby provide an electrolyte fill port;
   d) filling the electrolyte into the casing through the fill port; and
   e) melting the second platinum-containing material in the second via hole to thereby close the electrolyte fill port.

29. The method of claim 21, including polishing the inner surface of the ceramic plate to a surface roughness of less than 10 nm.

* * * * *